United States Patent [19]
Toplis

[11] 3,901,300
[45] Aug. 26, 1975

[54] NON-INFLATABLE TIRE AND APPARATUS FOR PRODUCING SAME

[75] Inventor: John Geoffrey Toplis, Nottingham, England

[73] Assignee: Raleigh Industries Limited, Nottingham, England

[22] Filed: Aug. 1, 1973

[21] Appl. No.: 384,598

Related U.S. Application Data

[63] Continuation-in-part of Ser. No. 344,132, March 23, 1973, abandoned.

[30] Foreign Application Priority Data
Mar. 24, 1972 United Kingdom............... 13859/72

[52] U.S. Cl. ............................................. 152/246
[51] Int. Cl.² ......................................... B60C 7/00
[58] Field of Search .................................... 152/246

[56] References Cited
UNITED STATES PATENTS

| 1,159,760 | 11/1915 | Genth | 152/246 |
| 2,185,398 | 1/1940 | Brunswick | 152/246 |

*Primary Examiner*—James B. Marbert
*Attorney, Agent, or Firm*—James E. Nilles

[57] ABSTRACT

A hollow non-inflatable tire having a series of internal circumferentially spaced radial ribs extending from the tire side walls and inwardly of the tire. An apparatus including a three-part mold and in which the tire may be molded. The combination includes a wheel and hollow non-inflatable tire of the above type, both the wheel and tire having curved surfaces which are bonded together, the shape of the tire being such as to facilitate assembly of the tire on the wheel.

11 Claims, 6 Drawing Figures

NON-INFLATABLE TIRE AND APPARATUS FOR PRODUCING SAME

REFERENCE TO RELATED CO-PENDING APPLICATION

This is a continuation-in-part of the co-pending U.S. patent application Ser. No. 344,132, filed Mar. 23, 1973 and entitled "Non-inflatable Tire and Apparatus for Producing Same", now abandoned.

BACKGROUND OF THE INVENTION

This invention pertains to tires and apparatus for their production and in particular non-inflatable hollow tires of the kind which are, for example, used on light vehicles such as small bicycles, tricycles, and other forms of toys such as tractors, cars and the like.

There are hollow non-inflatable tires in use at the present time but one of their disadvantages, unless they are formed with thick walls, which is uneconomical, lies in the fact that they tend to roll laterally. When the tire is made to overcome this disadvantage the result is the production of a "hard" tire which has insufficient radial deflection capability which results in a hard ride. To produce the optimum tire of the kind referred to, it is necessary to provide resistance to lateral rolling combined with radial deflection capability, and to achieve this while keeping costs to an acceptable level has heretofore been found to be substantially impossible.

SUMMARY OF THE INVENTION

It is an object of this invention to produce a commercially acceptable non-inflatable hollow tire and a further object to provide an apparatus for producing the tire.

According to one aspect of the present invention, a hollow non-inflatable tire is provided of integral construction and comprising a wheel-engaging portion, side walls, a road-engaging portion, and an internal series of ribs on each side wall, the ribs of each series being spaced apart circumferentially in substantially regulat fashion and each rib extending transversely of the tire, part way only across its width.

According to a further aspect of the present invention, an apparatus is provided for producing a hollow, non-inflatable tire, the apparatus comprising a three-part mold, there being two cooperating outer mold parts and a core part, the core part being of disc form and having spaced lateral ribs which cooperate with the outer mold parts to form a cavity in which elastomeric material may be molded to produce an integrally ribbed hollow non-inflatable tire.

DESCRIPTION OF A PREFERRED EMBODIMENT

Figure 1:
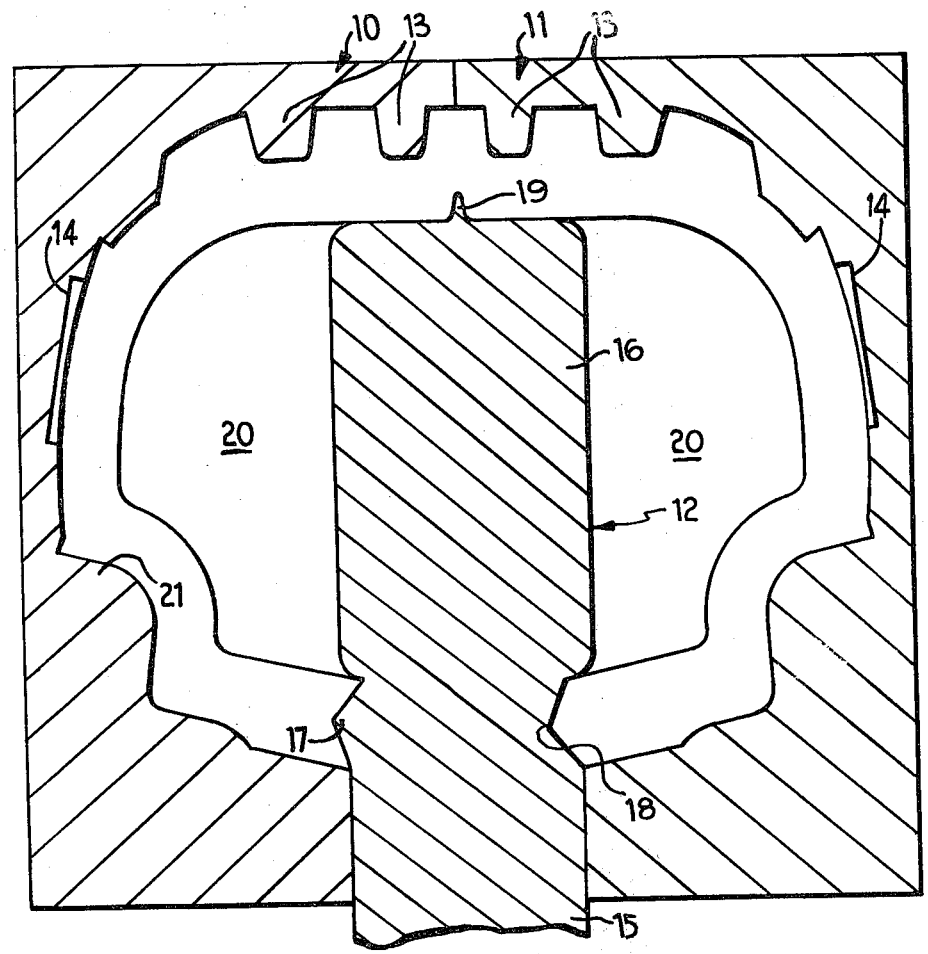
FIG. 1 is a diagrammatic cross sectional view through a tire mold of the present invention.

The mold (FIG. 1) for producing a hollow, noninflatable tire in accordance with this invention comprises three parts, namely outer parts 10 and 11 and a core or inner part 12. Each outer part is formed so as to represent approximately one-half of the tire to be molded, including the tread 13 on the radially outer wall OW and characters 14 on the tire side wall, such as references to tire size, manufacturers names and the like. The tread shown and the slope of the external walls of the mold parts 10 and 11 are only diagrammatically illustrated and these forms may be altered to meet various requirements.

The core 12 of the mold is of disc form and comprises a central region 15 and an outer or peripheral region 16. The outer region 16 is somewhat thicker than the central region 15 and between these two parts of the core are tire joint forming contours consisting, for example, on one face of the core of a projection 17 which is of wide V-shape which protrudes from the core face, and, on the opposite face of the core 12 a wide V-shape recess 18 which is complementary in shape and size to projection 17.

At the extreme periphery of the core 12 and centrally of its edge there is preferably formed a continuous V-shape rib 19 so that a tire, when molded will have a V-shape recess 19a extending centrally around the inner surface of the radially outer wall OW. This rib means forms a hinge means for the completed tire, as will appear.

Extending laterally from the faces of the outer region 16 are spaced ribs 20. The number and spacing of the ribs 20 will vary from tire size to tire size depending also to some extent upon the anticipated loading of the tire.

The present invention finds its most useful application in the manufacture of tires for smallwheel bicycles. One popular such tire measures 11 inches in outside diameter by 1¾ of an inch maximum width. We have found that, in this case, excellent resullts are achieved if the ribs 31 are one-eighth of an inch thick and if those of each series are spaced at three-quarters of an inch intervals. Indeed three-quarters of an inch spacing or thereabouts, will probably be preferred for all tires of conventional dimensions. It is thought that, in order to obtain satisfactory results, the spacing should not exceed 1 inch or be less than one-quarter of an inch. With spacings much greater than or much less than three-quarters of an inch it is best to increase or decrease respectively the rib thickness to some extent, so as to maintain a spacing to thickness ratio of about six, although spacing to thickness ratios of between four and eight will be "generally useful".

The mold is provided with runners and vents (not shown) to enable it to be filled and means are provided for maintaining the mold parts in the correct juxtaposition during molding.

As can be seen from FIG. 1, the outer mold parts 10 and 11 are shaped so as to provide an inwardly curved step 21 in the tire which will locate snugly on the wheel rim. This step is located generally at the juncture of the side walls of the tire and the radially inner wall IW of the tire. These steps 21, together with ribs 22 (see FIG. 2) serve to improve the lateral stability of the tire and to counteract to a noticeable extent the tendency of the tire to roll.

It will be appreciated that the tire form as it is extracted from the mold is not exactly as required since it is wider than necessary. This, however, has no adverse effect and in fact, when the tire is fitted its dimensions are correct when the mating or complementary V-shaped edges 17a and 18a of the radially inner wall IW of the tire come into contact as shown at 23 in FIG. 2.

Figure 2:
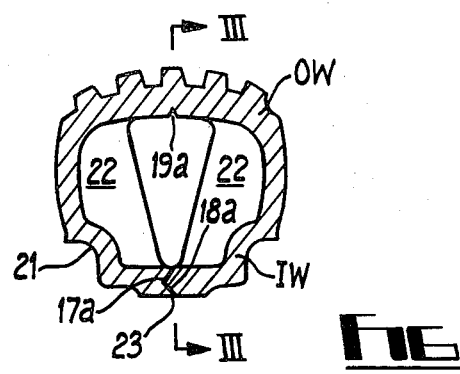
FIG. 2 is a cross sectional view through a tire made in the mold of FIG. 1, but on a reduced scale.
Figure 3:
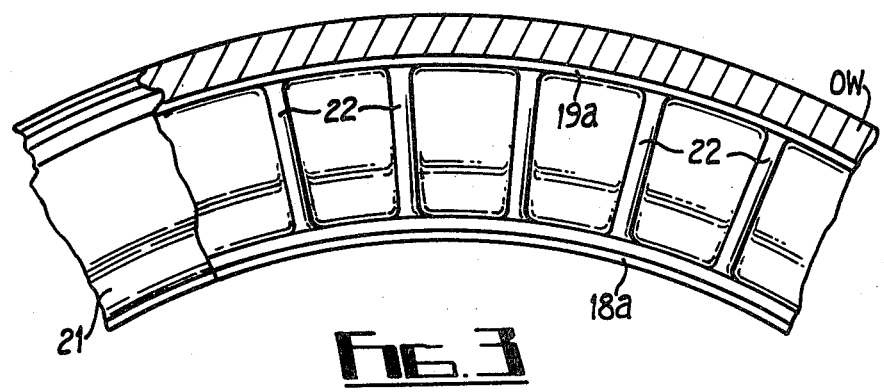
FIG. 3 is an enlarged sectional view taken generally along the line 3—3 in FIG. 2.
Figure 4:
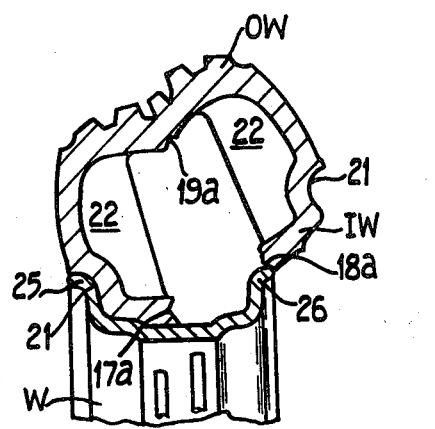
FIG. 4 is a view similar to FIG. 2, but showing only one side of the tire in place on the wheel rim and showing the tire pulled apart as when being installed.
Figure 5:
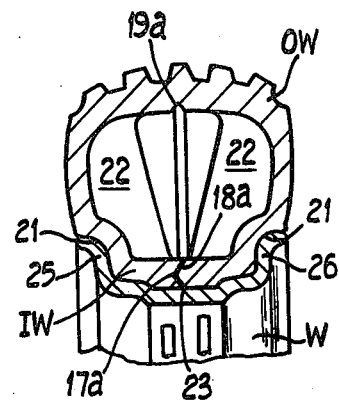
FIG. 5 is a view similar to FIG. 4, but showing the tire completely assembled on the rim.
Figure 6:
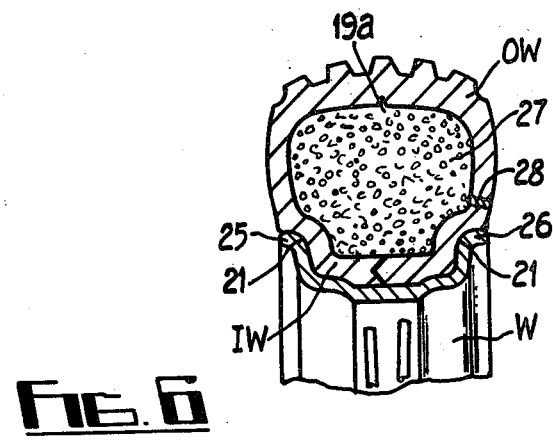
FIG. 6 is a view similar to FIG. 5, but showing the tire filled with foam material.

The formation of the internally located V-shaped recess 19a centrally of the tire tread enables the tire to "hinge" easily for assembly on the wheel W. When the tire is fitted on the wheel, the edges of the V recess 10a come together, as shown in FIG. 2.

As shown in the drawings, the tire preferably has substantially constant thickness walls. Furthermore, if desired, the outer faces of the tire walls can be ribbed if desired, such ribs being either circumferential or radial or in some cases a combination of such ribs may be provided.

A tire constructed in the manner described above, will be relatively easy to fit to the wheel W since, being split along its radially inner wall IW, it may be fitted in the same manner as a pneumatic tire, that is, one side wall can be pressed over the wheel rim 25 initially and the other side wall can then be pressed over the opposite wheel rim 26. This will, therefore, avoid the need unduly to stretch the tire, even though its internal diameter will be somewhat less than the rim to which this is to be fitted.

If desired, the V-shaped recess 19a formed in the tires, can be coated with adhesive so that the mating edges become bonded together when the tire is fitted. Similarly the corresponding mating edges 17a, 18a which together form the joint 23 can be adhesive coated so that they also will become bonded together when the tire is fitted.

In a further modification, the tire, when fitted, may be filled with foam 27 if desired, such filling being for example, injected through orifice, means 28 in the tire wall.

In the example described the ribs of each series are correspondingly positioned. In other words each rib of the one series is exactly opposite a rib of the other series. While such an arrangement is preferred, the ribs of one series may be staggered evenly or otherwise, with respect to the ribs of the other series. If the rib positions of each series coincide then it is obviously desirable that their inner edges should be sufficiently spaced apart to avoid undesirable interference with each other during deformation of the tire in use. If the ribs of each series are staggered the individual ribs could extend past the tire center-line.

What is claimed is:

1. A hollow non-inflatable tire in the form of a one-piece moulding of elastomeric material and comprising a road-engaging portion, two side walls continuous with said rod-engaging portion, a wheel-engaging portion having two separable parts one part continuous with one said side wall and the other part continuous with the other said side wall, contiguous surfaces at the ends of said separable parts, interengageable formations on said contiguous surfaces, a first series of internal transversely extending ribs formed continuously with the one said side wall, with a portion of said road-engaging portion adjacent said one said side wall, and with the separable part of said wheel-engaging portion which is continuous with said one said side wall, and a second series of internal transversely extending ribs formed continuously with the other said side wall, with a portion of said road-engaging portion adjacent said other said side wall, and with the separable part of said wheel-engaging portion which is continuous with said other said side wall, each said rib, when said interengageable formations are interengaged, extending over less than half the interior transverse dimension of the tire at said road-engaging portion but extending over an increasingly greater proportion of the interior transverse dimension of the tire up to a maximum at said wheel-engaging portion.

2. A tire as set forth in claim 1 in which said wheel-engaging portion has pronounced steps therein for engagement with the rim of a wheel.

3. A tire as set forth in claim 1 in which each rib of one series is aligned with a rib of the other series.

4. A tire as set forth in claim 1 in which the ribs of one series are staggered with respect to the ribs of the other series.

5. A tire as set forth in claim 1 in which said contiguous portions of said separable parts are coated with adhesive.

6. A tire as set forth in claim 1 in which at least one circumferential recess is provided centrally and internally of the road-engaging portion thereof.

7. A tire as claimed in claim 1 in which the spacing of each rib from the next adjacent rib is between one-quarter of an inch and 1 inch.

8. A tire as claimed in claim 1 in which the spacing of each rib from the next adjacent rib is three-quarters of an inch.

9. A tire as claimed in claim 1 in which the ratio of the spacing of the ribs of each series to their thickness is between four and eight.

10. A tire as claimed in claim 1 in which the ratio of the spacing of the ribs of each series to their thickness is six.

11. A hollow non-inflatable tire in the form of a one-piece molding of elastomeric material and comprising a road-engaging portion, two side walls continuous with said road-engaging portion, a wheel-engaging portion having two separable parts one part continuous with one said side wall and the other part continuous with the other said side wall, contiguous surfaces at the ends of said separable parts, interengageable formations on said contiguous surfaces, a first series of internal transversely extending ribs formed continuously with the one said side wall, with said road-engaging portion adjacent said one said side wall, and with the separable part of said wheel-engaging portion which is continuous with said one said side wall, and a second series of internal transversely extending ribs formed continuously with the other said side wall, with said road-engaging portion adjacent said other said side wall, and with the separable part of said wheel-engaging portion which is continuous with said other said side wall, the rib dimensions being such as to provide greater reinforcement to said side walls than to the central part of said road-engaging portion, whereby the resistance of the tire to lateral roll is increased and the tire wall flex preferentially under stresses experienced in manufacture and use generally at the central part of said road engaging portion.

* * * * *